United States Patent [19]

Valavaara

[11] Patent Number: 4,749,347
[45] Date of Patent: Jun. 7, 1988

[54] TOPOLOGY FABRICATION APPARATUS

[76] Inventor: Viljo Valavaara, 5484 Tomken Road, #14, Mississauga, Ontario, Canada, L4W 2Z6

[21] Appl. No.: 921,124

[22] Filed: Oct. 21, 1986

Related U.S. Application Data

[63] Continuation-in-part of Ser. No. 770,514, Aug. 29, 1985, abandoned, which is a continuation-in-part of Ser. No. 618,240, Jun. 7, 1984, abandoned.

[51] Int. Cl.⁴ .............................................. B29C 47/92
[52] U.S. Cl. .............................. 425/135; 156/244.11;
  156/500; 264/40.1; 264/219; 264/544; 264/547;
  425/140; 425/150; 425/162; 425/375; 425/381;
  425/465
[58] Field of Search ....................... 425/87, 131.1, 135,
  425/140, 150, 162, 375, 381, 458, 465, 466, 141;
  264/40.1, 40.7, 167, 176.1, 219, 220, 225, 319,
  544, 547; 364/167, 168, 468, 469, 473, 562;
  156/350, 357, 358, 500, 244.11

[56] References Cited

U.S. PATENT DOCUMENTS

| | | | |
|---|---|---|---|
| 3,228,650 | 1/1966 | Gilliland et al. | 264/225 X |
| 3,677,681 | 7/1972 | Zippel et al. | 264/40.1 X |
| 3,780,154 | 12/1973 | Muller et al. | 264/167 X |
| 3,830,610 | 8/1974 | Ohkawa et al. | 425/141 |
| 3,995,980 | 12/1976 | Smith | 425/131.1 |
| 4,345,889 | 8/1982 | Sizemore et al. | 425/150 X |
| 4,415,967 | 11/1983 | Russell | 364/168 |
| 4,439,125 | 3/1984 | Dieckmann et al. | 264/40.7 X |
| 4,532,093 | 7/1985 | O'Malley et al. | 264/40.1 |
| 4,591,402 | 5/1986 | Evans et al. | 156/350 |

Primary Examiner—Richard L. Chiesa
Attorney, Agent, or Firm—George A. Rolston

[57] ABSTRACT

Topology body apparatus having an extrusion head for extruding a settable plastic material, a mounting arm on which the extrusion head is mounted, a carriage bar on which the mounting arm is mounted, a base, extrusion head drive means for driving the extrusion head relative to the carriage bar, carriage drive means for driving the carriage bar relative to the base, and control means for controlling the extrusion head, the extrusion head drive means and the carriage drive means, separately and independently from one another, to procure three axes of movement of the extrusion head to progressively extrude and deposit portions of a three-dimensional solid body having a predetermined topography.

9 Claims, 4 Drawing Sheets

TOPOLOGY FABRICATION APPARATUS

This application is a continuation in part of Application Ser. No. 770,514 filed Aug. 29, 1985, now abandoned, which is a continuation in part of Application Ser. No. 618,240 filed June 7, 1984, now abandoned, and both entitled "Topology Fabrication Apparatus and Method".

The invention relates to an apparatus for manufacturing a three-dimensional body, such as a body, having an upper surface topology reproduced from electronic data information, derived from other sources such as from a drawing, or another article, and is of particular interest for use in the foundry pattern industry, but has many other uses.

BACKGROUND OF THE INVENTION

Foundry pattern craftsmen require many years of careful training, and must exercise a high degree of skill. The accuracy of the finished casting is dependent entirely on the accuracy of the pattern itself, and consequently the work cannot be undertaken by unskilled trades people. The training of such patternmakers in fact represents such a considerable investment that few companies are willing to undertake it. In addition, it is becoming difficult to find new recruits to enter the trade.

In addition, since the trade or craft is highly skilled, and is relatively slow, the cost of foundry patterns is becoming excessive.

Usually, the patterns are made of solid wood, usually sections of wood joined together, so as to provide the desired exterior topology of the finished casting.

There are many other instances when it is desired to reproduce a surface or topology using electronic data information. For example, topology models may be made from topographical map information, or from EDP information derived from stereo photographs, the information being used to make a three-dimensional topology model. Similarly, architectural drawings, or marine drawings may also be compiled as EDP information. In addition there are many manufacturing techniques and articles which should ideally be modelled prior to finalizing the design, but in many cases are not possible due to the difficulty of making satisfactory patterns or models at an economical price.

For all of these reasons it is, therefore, desirable to provide a machine capable of reproducing a predetermined topology, on the upper surface of a body. In particular, it is desirable that such a machine shall be capable of reproducing the three-dimensional topographical surface of an article, from a drawing of that article.

It is also desirable that such a machine should be capable of reproducing the topology of an article itself.

BRIEF SUMMARY OF THE INVENTION

The invention therefore seeks to overcome the foregoing problems, and to achieve the general objective set out above, and comprises apparatus having an extruder and extrusion head, operable intermittently to extrude predetermined quantities of a fast setting plastic material, a mounting arm on which said extrusion head is mounted, a carriage bar on which said mounting arm is mounted, a base defining a surface, extrusion head drive means for driving said extrusion head, carriage bar drive means for driving said carriage bar, and control means for controlling said extrusion head, said extrusion head drive means and said carriage bar drive means, separately and independently from one another, whereby to produce three axes of movement of said extrusion head to progressively extrude and deposit portions of a three-dimensional body having a predetermined topology on said surface of said base.

More particularly, it is an objective of the invention to provide such an apparatus including data storage means, communicating with said control means, whereby data relating to the topology of such a body may be stored and processed, and reproduced for a programmed operation of said control means.

More particularly, it is an objective of the invention to provide a method for the manufacture of a solid body having a predetermined three-dimensional upper surface topology and comprising the steps of depositing a strip of a settable plastic material from an extrusion head, along a predetermined linear path, moving at least part of said extrusion head in a vertical plane, while moving the same along said linear path, moving said extrusion head laterally of said predetermined linear path by a predetermined increment, again traversing said extrusion head along said linear path, and extruding another strip of said material, and again varying the vertical position of said part of said extrusion head while moving the same along said path, and repeating said steps a sufficient number of times, to develop a solid body having the desired topology.

More paraticularly, the invention seeks to provide such a method wherein topology information is input into a data storage means, and such information is then accessed to control the movement and vertical position of such extrusion head to reproduce the topology of the article from such topology information.

More particularly, it is an objective of the invention to provide such a method wherein the three-dimensional topology surface of such body is subsequently subjected to a smoothing and finishing operation, and is thereafter coated with a wear resistant metal coating, whereby the same may be used as a pattern or die.

More particularly, it is an objective of the invention to provide an apparatus having the foregoing advantages wherein said extrusion head incorporates a gate means, which may be moved vertically to vary the height of the strip of material being extruded, and wherein the gate means may be tilted, so as to provide the upper edge of said extruded material with an angled surface, and including means for tilting said gate means to provide a desired angle, for each said strip.

It is a further and related objective of the invention to provide a method and apparatus for forming a body, by extruding a series of flat strips of a settable compound one above the other, and by offsetting successive strips from one another as required, to form an upper surface topology of predetermined shape.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 4 is a top plan view of a partially formed topology body from the embodiment of FIG. 3; and, FIG. 5 is a sectional side elevation along 5—5 of the body of FIG. 4.

DESCRIPTION OF A SPECIFIC EMBODIMENT

Figure 1:
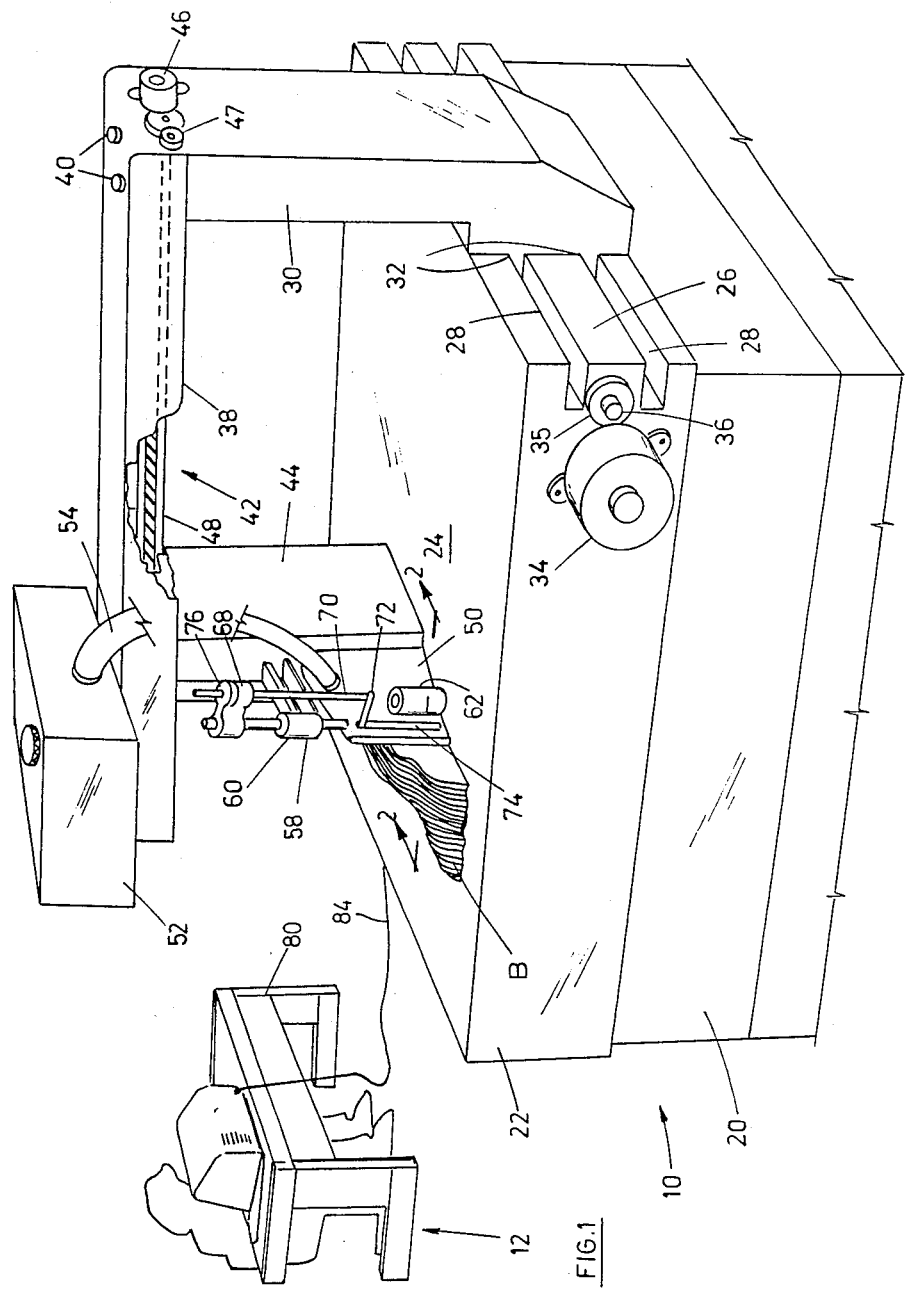
FIG. 1 is a perspective illustration showing an apparatus according to the invention together with a control centre and information input keyboard.
Figure 2:
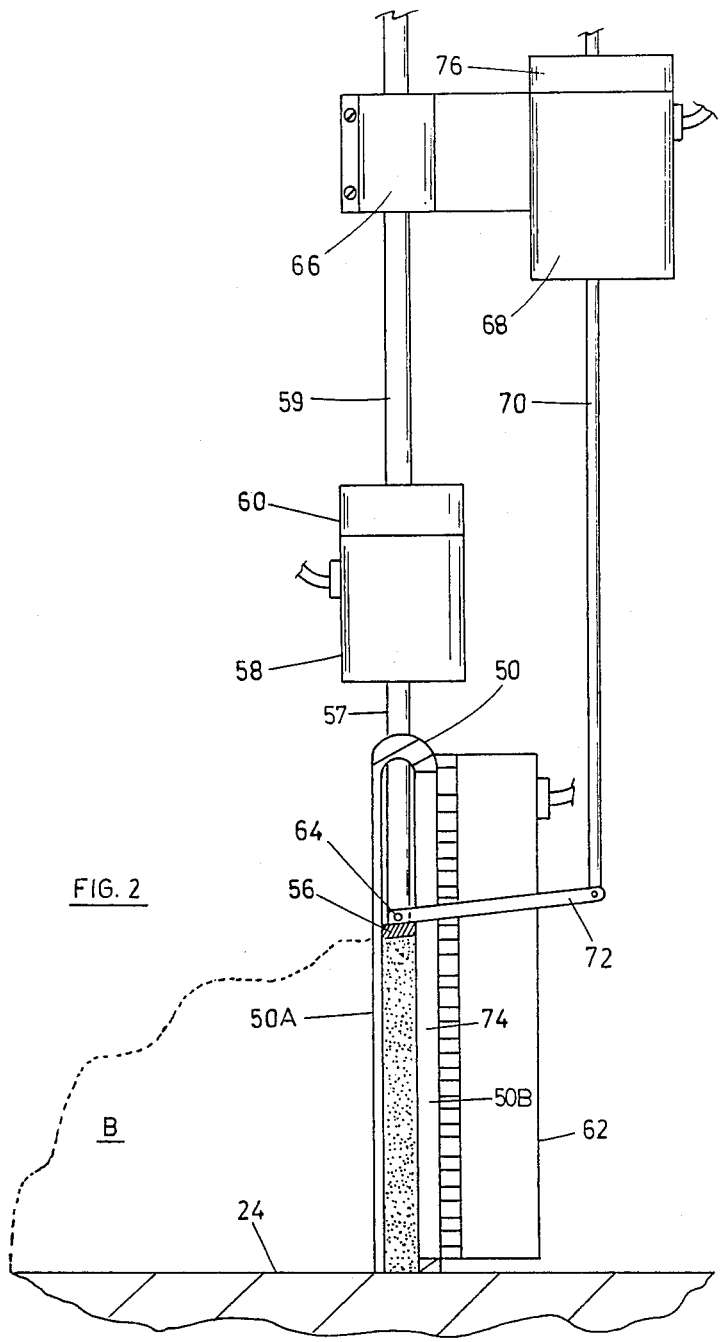
FIG. 2 is a section along 2—2 of the apparatus of FIG. 1 with certain parts omitted.

As best shown in FIGS. 1 and 2, the apparatus according to the invention will be seen to comprise the two main assemblies comprising the three-dimensional topology forming apparatus 10, and the control console 12.

The topology forming apparatus 10 will be seen to comprise a cabinet 20, which in this embodiment provides the base of the apparatus on which it stands on a floor. It is of course quite apparent that the base need not be in the form of a cabinet, but can be in the form of legs or any suitable support frame.

A work platen 22 is supported on the upper end of the cabinet 20, and defines a flat working surface 24, on which the three-dimensional body B according to the invention will be formed.

Typically the platen 22 will be of steel, and have a ground and polished surface 24 to ensure that such articles are produced with a flat under surface.

If desired, the surface may be treated with a suitable "release" material such as is well known in the art. Along one side of cabinet 20, adjacent to the edge of platen 22, there is provided a horizontal linear track 26. In the embodiment shown, the track 26 consists of upper and lower channels 28 formed in a massive solid member. However it will be appreciated that the design and details of such track may vary widely depending upon the engineering requirements of the particular machine.

An upright carriage arm 30 is provided, having lower bearing means 32 engaging in the track 26, and such carriage arm 30 may thus run to and fro along the linear path described by the track.

Suitable powered movement means are provided, in the form of, for example, a motor 34, and continuous drive screw 36, of known design, such as are well known in the art and require no further description. Such a motor 34 may be either electrically powered or hydraulically powered or powered in any other suitable way, and provided with suitable forward and reverse selectors (not shown).

Preferably the motor 34 is a "stepper" motor such that its actual position can be incrementally controlled, and its position is known at any given moment.

Variations may include a positional detector and feed back 35 to achieve the same general purpose.

A generally horizontal support arm 38 extends laterally from the upper end of carriage arm 30. The inboard end of the support arm is preferably permanently attached to the upper end of the carriage arm. However, depending upon the engineering of the apparatus, it is conceivable that the inboard end of the support arm might be movable laterally relative to the top of the carriage arm so that it may traverse inwardly and outwardly with relation to the carriage arm along a linear path normal to the linear path of track 26.

In this latter case it would of course be provided with suitable powered movement means (not shown) and controls by means of which its lateral movement may be controlled in a manner described below.

While reference is made to such a support arm 38, being "generally horizontal" it will of course be appreciated that the actual configuration of the arm could be in the form of an arch, or a more complex framework, the principal function of which is merely to extend laterally over the work platen.

In the embodiment shown, the support arm 38 is joined by bolts 40, to the upper end of carriage arm 30.

On its underside, it is provided with a transverse horizontal track 42.

An extruder arm 44 is movably mounted on arm 38. Extruder arm 44 has at its upper end suitable bearings (not shown) running in track 42, by means of which extruder arm 44 may be traversed to and fro along the length of arm 38. The lower end of arm 44 extends downwardly onto surface 24 of platen 22.

Movement of arm 44 is controlled by means of motor 46 and typically a drive screw 48 indicated in phantom.

Motor 46 will preferably be similar to motor 34, so that the drive screw 48 can be moved in increments, and its position is known.

A position detector for extruder arm 44 can also be used, with a feed back 47 for similar purposes.

Extruder arm 44 supports an extruder head 50. Extruder head 50 is shown in more detail in FIG. 2. It is connected to a container 52, containing a suitable settable plastics material, by means of, for example, flexible hose 54. Container 52 is shown mounted on arm 38. It will however be appreciated that the mounting and location of the container 52 will depend upon a number of factors, and it could be supported independently. Preferably, in accordance with known practice in the art, it may also comprise a heating element, a power-operated screw conveyor and the like, and it may be adapted either for use with granular solid plastic material, or powered material or other forms of material depending upon the particular design of the apparatus in each case. The container 52, therefore, is merely a schematic representation of a source of settable plastics material and is not to be regarded as definitive. Head 50 comprises opposed side walls 50A and 50B, forming a generally inverted U-shaped structure, open at the bottom and one end.

The extruder head 50 contains within it a vertically movable doctor blade or gate 56, controlled, for example, by means of rod 57 and cylinder 58. In this way, the blade 56 may be moved upwardly and downwardly within extruder head 50 for reasons to be described below. Again, the representation of a doctor blade 56 and cylinder 58 are representative of a variety of different means whereby the end result may be achieved.

A position detector 60 is preferably mounted on cylinder 58, to indicate the position of gate 56. A feed back circuit (not shown) connects to the controls (described below) so that the location, or height, of gate 56 is known at all times.

The purpose of the extruder head 50 is to extrude successive relatively thin sections of settable material, wherein the upwardly directed surface of profile varies in height above the level work surface 24. One side portion 50A of extruder head 50 is of reduced width to allow material to be extruded therefrom, directly into contact with the previously extruded section.

An air jet assembly 62 (shown fragmentarily in FIG. 1) is preferably mounted on extruder head 50, to direct air jets through appropriate openings in the head 50 onto the material as it is extruded. The jet is so directed so as to deflect the material into contact with the previously extruded section.

The under surface of the blade or gate 56 will define the top surface of the extruded body. It will be appreciated that the hose 54 is adapted to supply the material to the extruder 50 below the blade 56.

If each thickness of extruded material is extremely thin, then a body would be built up by extruding successive strips, the upper edges of which define an upper surface which was very close to the surface of the article to be modelled.

However, as a practical matter, it is desirable to extrude the material in strips which are somewhat thicker, and, as a result, the upper surface of the body will define a series of stepped ridges.

While these may be finished off with a filling or polishing operation, it is desirable as far as possible to reduce this to a minimum.

Accordingly, the invention provides that the gate 56 may be tilted, i.e., rotated along its longitudinal axis. The degree of tilt or rotation will define the angle of slope along the upper edge of the extruded strip.

Typically, using suitable EDP techniques, this angle may be calculated automatically in the program for each strip, or indeed continuously along the length of each strip, so as to optimize the angle of the gate 56 at all points.

The mechanism whereby the angle of tilt of the gate 56 may be adjusted is shown in FIGS. 1 and 2. This will be seen to comprise a pivot mounting 64, on the upper surface of blade 56, connecting it to the lower end of the cylinder rod 57.

The rod 57 is extended upwardly through the position detector 60 as extension 59, and thus moves up and down in unison with the up and down movement of the gate 56.

At a suitable height on rod 57, a clamp 66 is fastened. Clamp 66, in turn, supports a cylinder 68, from which extends a rod 70. The lower end of rod 70 is connected by means of a crank level 72 to the upper surface of gate 56. A suitable vertical slot 74 is provided in side wall 50B of extrusion head 50 to receive the crank lever.

A position detector 76 is also mounted on the cylinder, so as to sense the position of the gate 56.

It will of course be appreciated that the mechanism whereby gate 56 is raised and lowered, and is tilted to and fro, may vary depending upon the design of the machine. The mechanism shown is merely exemplary for the purpose of understanding the invention.

The console 12 will consist of any suitable type control devices. In this embodiment there is shown a table 80, and a computer terminal 82 (and screen) connected to the apparatus 10 by a suitable cord 84.

In operation an operator will first of all program the computer 82 by inputing the data relating to a body having a predetermined topology. Such data will essentially be the coordinates of the topology of the body along three reference axes. The information will, of course, simply be the height of a particular point of the body above the surface 24 (one axis) at any particular coordinates of length and breadth (the other two axes).

With this information, and given a suitable program in the computer, the computer will then issue commands to the apparatus 10.

By movement of the motors 34 and 46, arms 30 and 44 will be moved to the appropriate coordinate at which to commence extrusion. The doctor blade 56 will be moved to the appropriate height, and the extruder head 50 will commence extrusion of a thin upright section of settable material. The material will be extruded with its base directly onto surface 24. The motor 34 will then move arm 30 along surface 24 a predetermined distance, during which the doctor blade 56 will be moved to the appropriate height by cylinder 58 in accordance with instructions from the computer.

The blade or gate 56 will also be tilted about its longitudinal axis, so as to optimize the angle of slope on the upper surface of the extruded strip, in the manner described above.

There will thus be extruded a thin continuous section of settable material, the upper surface of which has the topology of the article to be reproduced, along that particular coordinate.

During this first pass, the air jets may be off so as to avoid deflecting the first section. In some cases it may be desirable, however, to erect a perpendicular flat wall panel (not shown) on surface 24. The first section would then be extruded, and deflected onto such wall panel, for temporary support.

Arm 30 then reverses in order to commence extrusion of the next section.

In each case, after the completion of one traverse moment of arm 30, arm 44 will of course have to be somewhat retracted away from the body B by operation of motor 46, so that arm 30 can return to the start position for extrusion of the next section.

In fact, arm 44 will have to be retracted in most cases a distance somewhat greater than the thickness of the material to be extruded, and once it is at the start position, arm 44 will then have to be extended until the extruder head 50 is just in contact with the previously extruded section.

It will thus be seen that by the progressive extrusion of successive thin vertical sections of material, a body B can be built up which has a flat under surface, and has an upper topology which is a reproduction of the topology information in the computer.

It will of course be appreciated that the information to the apparatus 10 could be developed in ways other than inputing the information into a computer.

For example, it will be possible to set up in a jig an existing article having a desired topology, and then simply have a copier head traversing along successive axes of that article. Information thus developed could be passed directly to the apparatus 10 for reproduction.

In practice, however, it is believed that the information would be first of all be inputted into the computer for processing into suitable form for use in the apparatus 10.

In a great majority of cases however it will be possible to program the computer directly from drawings of an article, and without having first of all to make the article itself.

In this way, the topology and profile of a variety of different products may readily be developed by machine directly from working drawings, without the necessity of making models.

It will also of course be appreciated that the body B is particularly suitable for use as a foundry pattern.

Conceivably it can also be used to make a metal working die.

In the majority of cases, some form of surface finishing steps will be required. These may include either grinding down any ridges on the surface, which may be left by the extrusion of successive vertical sections of material.

In other cases, it may consist simply of filling the surface with a suitable filler and polishing it. In order to provide a metal-working die or at least a surface having a longer life, it may be desirable to apply some form of metal or metalized coating layer.

Various moldable and settable materials may be used. Synthetic plastic materials of this type are well known. Natural products such as clay may also be suitable. Some metal compounds and alloys could also be used in some cases.

Figure 3:
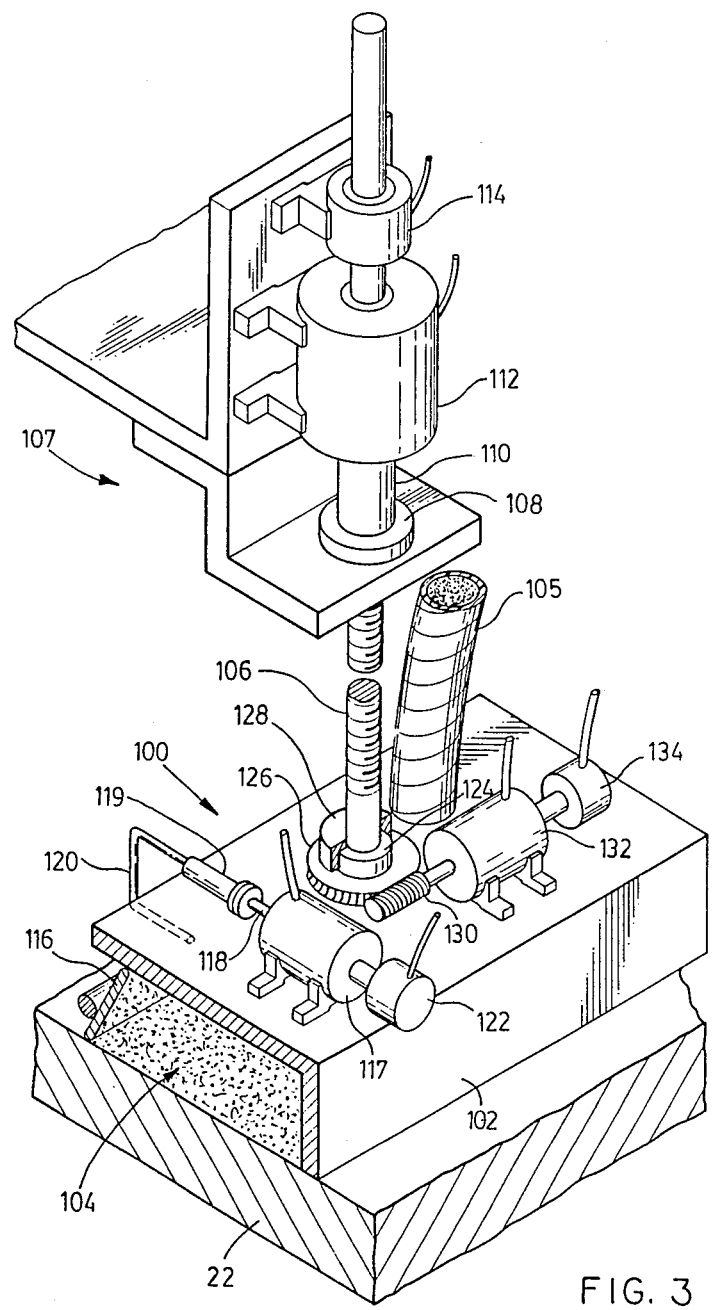
FIG. 3 is a fragmentary perspective view of an alternate form of extruder.

A further embodiment of the invention is illustrated in FIGS. 3, 4 and 5. In this form of the invention, the settable compound is extruded in the form of a thin band or tape. The extruded band of material has a predetermined thickness representing a predetermined height of the body to be formed. Successive bands or tapes are extruded and laid one upon the other, with the path on which the band is extruded, being varied slightly from one band to the next. In effect, each band or tape which is extruded will represent a common height of the body above the surface of the base plate, somewhat in the same way as contour lines on a map represent areas of common above sea level.

Referring first of all to FIG. 3, the apparatus by which this procedure is carried out comprises an extrusion head indicated generally as 100 replaces the extruder arm 44 and head 50 of the embodiment of FIG. 1. The extrusion head 100 is mounted on the support arm 38, and may be moved to and fro along the support arm 38 by means of the screw 48, in the same way as screw 48 moved the extruder arm 44.

The extrusion head 100 comprises an extrusion duct 102, defining a downwardly open extrusion outlet 104. The duct 102 is connected to a suitable flexible hose 105 for conducting extrudable material to the duct 102. The flexible hose is connected to any suitable source of extrudable material such as the container 52 of FIG. 1.

The duct 102 is movable upwardly and downwardly in a vertical plane, on the threaded shaft 106. Shaft 106 passes through a bracket assembly 107 connected to arm 42, and through nut 108 on sleeve 110. A motor 112 mounted on bracket assembly 107 drives sleeve 110 and nut 108. A positional feed back indicator 114 is also connected to the shaft 106, providing a readout of the position of the duct 102.

The outlet 104 of the duct 102 defines a predetermined height, which if desired may be made adjustable.

One side edge of the duct 102 indicated as 116 is pivotally mounted, and is provided with an operating means such as a motor 117 connected by threaded shaft 118, and the threaded sleeve 119, fastened to connecting rod 120. A positional readout 112 is also provided for indicating the position.

The lower end of shaft 106 is mounted in a rotary bushing 124 on duct 102 so as to permit rotation of duct 102 in a horizontal plane. A gear wheel 126 is attached to shaft 106 by a sleeve 128 around bushing 124. A worm gear 130 is mounted on duct 102. Gear 130 is driven by motor 132 and monitored by feedback 134.

The operation of this form of the invention is best illustrated with relation to FIGS. 4 and 5. A first tape or band B1 of the material is extruded directly on to the base 22. The band B1 will have the same height all along its length, and will define a regular width which will typically not vary along its length. The path along which the band is extruded is varied by means of moving the extrusion head 100 along two polar coordinates simultaneously. This is achieved by simultaneously operating the motor 46, to drive the screw 48, and also the motor 34 to drive the arm 30.

As the head 100 moves around its path or track, the open end of the opening 104 of duct 102 must face rearwardly at all times so as to feed the band of material smoothly.

This is achieved by motor 132, which is operated to rotate duct 102 and maintain it in the correct orientation.

Conceivably, where the successive bands are all laid out along straight lines, on a common axis, then rotation of the extrusion duct would not be requried. However, it is believed that this would be of limited application in practice.

As an alternative to rotating the duct 102, it would be possible to mount the platen 22 on a rotatable mount, and rotate the platen 22 progressively. Such rotation means are not illustrated herein, for the sake of clarity. Rotatable platforms or mounts are well known in the machine tool industry and require no special description.

In this way, by moving both the arm and the extrusion head simultaneously, with respect to the two polar coordinates, the strip or band can be laid out along any desired path.

After the extrusion head has moved on a first complete path and laid a continuous strip or band, the extrusion head is then moved upwardly in a predetermined indexing movement by a distance equal to the thickness of the band. This is achieved by means of the motor 112.

Motor 132 is then operated in the reverse direction so as to rotate duct 102 back to its original position.

The extrusion head is then again moved around a continuous path, in the same manner as before and deposits band B2. However, assuming the body is of a simple shape where the body tapers inwardly as its height increases, then the path or track around which the second band B2 is laid will be offset inwardly with respect to the first band.

These steps will be repeated (eg. band B3) until the top of the body is formed.

Obviously, bodies of much more intricate shape can be formed by this method.

In addition, it is possible to shape the profile of the outside edge of the strip or band as indicated at x and v, by tilting the movable wall 116 of the extrusion duct 102.

In this way it is possible to provide for a smooth convex curvature, or a concave curvature (FIG. 5).

It will of course be apparent that the finished body in this case will be a hollow structure.

If desired, when it has been formed and set, the body can simply be turned upside down and filled with another settable compound, if a solid body is required.

On the other hand, if all that is required is a topographical model, then this step may not be necessary.

In any event however it will be appreciated that this system has certain advantages over the system described in relation to FIGS. 1 and 2.

In the body illustrated generally in FIG. 1, in which the successive strips of material all are formed with their lower edges flat on the base, the strips of material would vary in height quite substantially.

Some settable materials may exhibit a certain degree of shrinkage upon setting. In this case, the degree of shrinkage will depend upon the height of the strip, so that a greater degree of shrinkage will occur and strips of greater height.

It is of course possible that in this case a computer program could be written which would automatically compensate for the degree of shrinkage.

However, by the practice of the method shown in FIGS. 3, 4 and 5, it will be appreciated that the shrinkage problem is very largely eliminated altogether, since each strip or band is of the same width and the same height.

Thus only one degree of shrinkage need be programmed into the computer in this case.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Apparatus for forming a body having a predetermined upper surface topology, and comprising:
    an extruder and extrusion head operable intermittently to extrude predetermined quantities of a settable plastic material;
    gate means in said extrusion head and controllable gate movement means, whereby the profile of said settable material can be varied during extrusion;
    mounting arm means on which said extrusion head is movably mounted;
    carriage means on which said mounting arm means is mounted for movement;
    a base defining a surface;
    extrusion head drive means for moving said extrusion head relative to said carriage means;
    carriage drive means for driving said carriage means and mounting arm means relative to said base;
    positional detector means for detecting the position of said extrusion head, said gate means, and, said carriage means; and,
    control means for controlling said extrusion head, said extruder, said extrusion head drive means, said gate means, and said carriage drive means, separately and independently from one another, whereby to procure two axes of movement of said extrusion head, and one axis of movement of said gate means whereby to progressively extrude and deposit portions of a three-dimensional solid body having a predetermined topology, on said surface of said base.

2. Apparatus as claimed in claim 1 including data storage means communicating with said control means, whereby data relating to the topology of such a body may be stored and processed, and reproduced for a programmed operation of said control means.

3. Apparatus as claimed in claim 2 including deflector means alongside said extrusion head operable to deflect said material as it is extruded.

4. Apparatus as claimed in claim 1 wherein said gate means may be tilted along its axis, and tilting means for controlling the angle of tilt of said gate means, and positional detector means for detecting the angle of tilt of said gate means.

5. Apparatus as claimed in claim 4 wherein said tilt operating means, and positional detector means are connected to said gate movement means, whereby the same may move upwardly and downwardly in unison with said gate means.

6. Apparatus for forming a body having a predetermined upper surface topology and comprising:
    an extruder and extrusion head operable to extrude predetermined quantities of settable plastic material;
    height adjustment means on which said extrusion head is mounted, and height motor means for adjusting said height adjustment means whereby said extrusion head may be raised and lowered on a vertical axis;
    mounting arm means on which said height adjustment means is mounted for movement along a first axis;
    carriage means on which said mounting arm means is mounted for movement along a second axis;
    a base defining a surface on which said body is formed;
    extrusion head drive means for driving said height adjustment means and said extrusion head along said first axis relative to said carriage means;
    carriage drive means for driving said carriage means and mounting arm means relative to said base along said second axis;
    positional detector means for detecting the position of said extrusion head, relative to said base, and control means for controlling said height motor means, said extrusion head drive means and said carriage drive means, separately and independently from one another whereby to procure movement of said extrusion head along said first and second axes independently from one another, and whereby also to procure movement of said extrusion head on said vertical axis.

7. Apparatus as claimed in claim 6 including data storage means communicating with said control means, whereby data relating to the topology of such a body may be stored and processed, and reproduced for a programmed operation of said control means.

8. Apparatus as claimed in claim 6 wherein said extrusion head is rotatably mounted, and including rotation motor means, and feedback means for rotating same.

9. Apparatus as claimed in claim 6 wherein said extrusion head includes extrusion duct means having opposite side walls, and a top wall, and one of said side walls being swingably mounted, and tilt motor means, and feedback means, for operating said swingable side.

* * * * *